US008770646B2

(12) United States Patent
Line et al.

(10) Patent No.: US 8,770,646 B2
(45) Date of Patent: Jul. 8, 2014

(54) ADJUSTABLE FLOATING SEAT

(75) Inventors: Johnathan Andrew Line, Northville, MI (US); Kendrick Alden Harper, Temperance, MI (US); John W. Jaranson, Dearborn, MI (US); Michael John Kitti, Plymouth, MI (US); Daniel Ferretti, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 10 days.

(21) Appl. No.: 13/251,469

(22) Filed: Oct. 3, 2011

(65) Prior Publication Data

US 2013/0082478 A1 Apr. 4, 2013

(51) Int. Cl.
*B60N 2/12* (2006.01)

(52) U.S. Cl.
USPC .......... 296/65.13; 297/331; 297/344.17; 296/209

(58) Field of Classification Search
CPC ............ B60N 2/0705; B60N 2/3002
USPC .......... 296/209, 65.13, 65.14, 65.15, 64; 297/331, 344.15, 344.17
See application file for complete search history.

(56) References Cited

U.S. PATENT DOCUMENTS

| | | | |
|---|---|---|---|
| 3,258,289 A * | 6/1966 | Malinowski | 296/65.14 |
| 3,476,435 A * | 11/1969 | Hitzelberger | 296/64 |
| 4,183,493 A | 1/1980 | Koutsky | |
| 5,320,411 A | 6/1994 | Sera | |
| 5,711,505 A * | 1/1998 | Nemoto | 248/424 |
| 6,012,771 A * | 1/2000 | Shea | 297/216.1 |
| 6,883,868 B2 * | 4/2005 | Yoshida | 297/331 |
| 6,916,057 B2 * | 7/2005 | Teich | 296/65.08 |
| 6,935,691 B1 * | 8/2005 | Sasaki et al. | 297/344.1 |
| 7,229,117 B2 * | 6/2007 | Okuda et al. | 296/64 |
| 7,252,318 B2 * | 8/2007 | Sumida et al. | 296/64 |
| 7,374,242 B2 * | 5/2008 | Champ et al. | 297/331 |
| 7,434,871 B2 * | 10/2008 | Mizuma et al. | 296/193.07 |
| 7,517,008 B2 * | 4/2009 | Ebel | 297/14 |
| 7,611,200 B2 * | 11/2009 | Jovicevic et al. | 297/331 |
| 7,780,234 B2 * | 8/2010 | Grable et al. | 297/331 |
| 7,854,461 B2 | 12/2010 | Yamada | |
| 8,104,834 B2 * | 1/2012 | Moegling et al. | 297/332 |
| 8,444,223 B2 * | 5/2013 | Moegling et al. | 297/331 |
| 8,459,748 B2 * | 6/2013 | Jovicevic | 297/481 |
| 2005/0057081 A1 * | 3/2005 | Kahn et al. | 297/331 |
| 2005/0146186 A1 * | 7/2005 | Kinnou et al. | 297/331 |
| 2005/0218683 A1 * | 10/2005 | Toyota et al. | 296/64 |
| 2006/0113828 A1 * | 6/2006 | Ryan et al. | 297/336 |
| 2011/0209924 A1 * | 9/2011 | Endo et al. | 177/136 |

* cited by examiner

*Primary Examiner* — Pinel Romain
(74) *Attorney, Agent, or Firm* — Vichit Chea; Price Heneveld LLP

(57) ABSTRACT

A seat assembly for a vehicle includes a support base. A seat is supported on the support base and cantilevered forwardly therefrom. The support base includes a first brace operably connecting the frame with a first slide assembly disposed on a rocker panel of the vehicle. A second brace operably connects the frame with a second slide assembly disposed on a transmission tunnel of the vehicle.

12 Claims, 16 Drawing Sheets

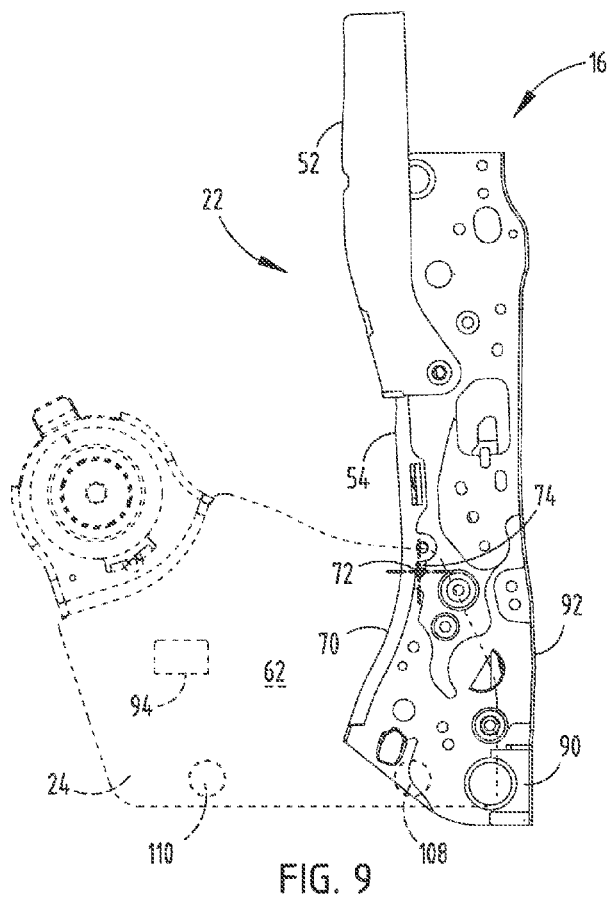
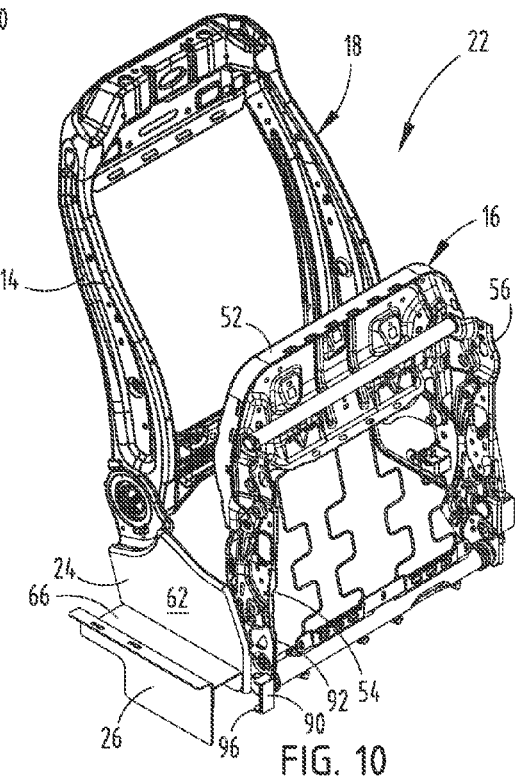
FIG. 9
FIG. 10

US 8,770,646 B2

ADJUSTABLE FLOATING SEAT

FIELD OF THE INVENTION

The present invention generally relates to a vehicle seat, and more particularly to an adjustable fore-aft and vertical floating seat.

BACKGROUND OF THE INVENTION

Seat assemblies are generally designed for vehicles to maximize comfort and provide a safe manner of transporting individuals in the vehicle.

SUMMARY OF THE INVENTION

According to one aspect of the present invention, a seat assembly for a vehicle includes a support base. A seat is supported on the support base and cantilevered forwardly therefrom. The support base includes a first brace operably connecting the frame with a first slide assembly disposed on a rocker panel of the vehicle. A second brace operably connects the frame with a second slide assembly disposed on a transmission tunnel of the vehicle.

According to another aspect of the present invention, a seat assembly for a vehicle includes a support base having a seat disposed thereon. A first brace operably connects the frame to a rocker panel of the vehicle. A second brace operably connects the frame to a transmission tunnel of the vehicle. The entire seat assembly is suspended above a floor of the vehicle.

According to yet another aspect of the present invention, a front passenger seat for a vehicle including a frame. A seat is operably connected to the frame. A first brace supports the frame and movably connects to a rocker panel of the vehicle. A second brace supports the frame and movably connects to a transmission tunnel of the vehicle. The seat is cantilevered forwardly from the first and second braces.

These and other aspects, objects, and features of the present invention will be understood and appreciated by those skilled in the art upon studying the following specification, claims, and appended drawings.

BRIEF DESCRIPTION OF DRAWINGS

In the drawings:

FIG. 9 is a side elevational view of a vehicle seat in a substantially vertical position;

FIG. 10 is a top perspective view of the vehicle seat of FIG. 8 with the seat in a substantially vertical position;

DETAILED DESCRIPTION OF EMBODIMENTS

Figure 1:
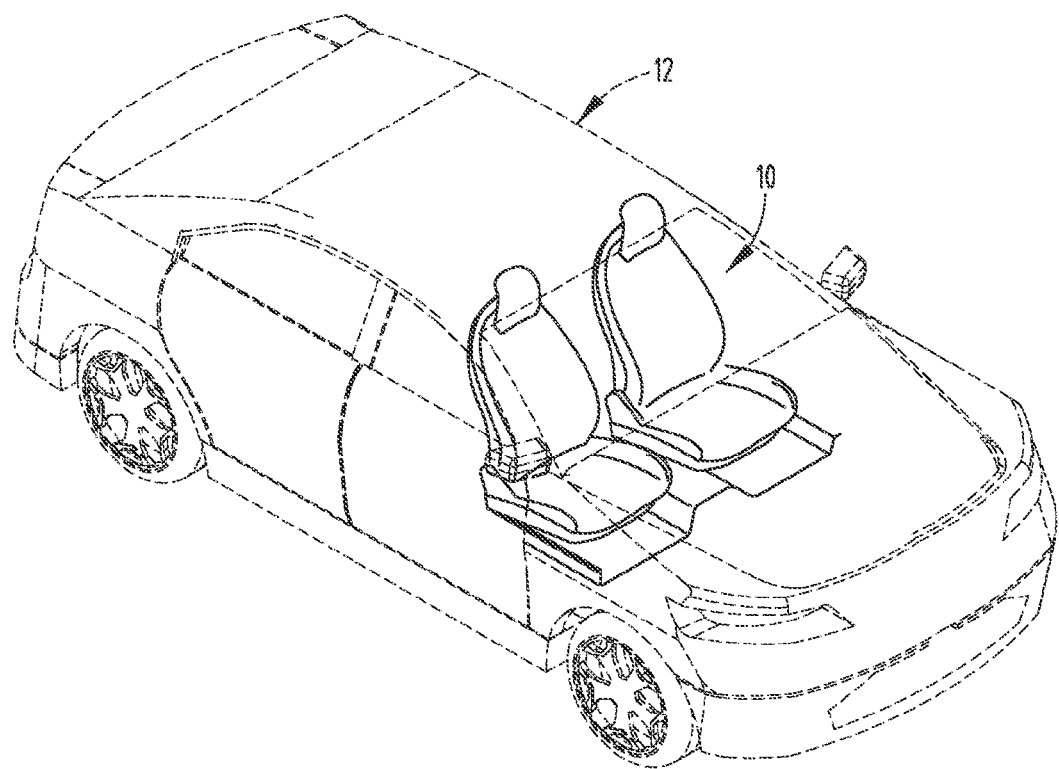
FIG. 1 is a top perspective view of a vehicle having a vehicle seating arrangement of the present invention.
Figure 1A:
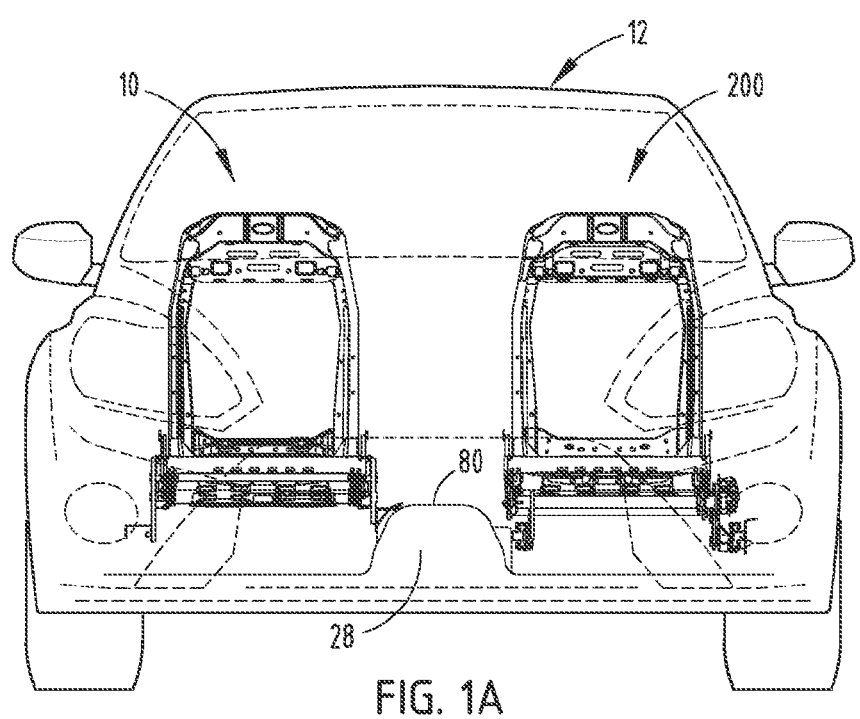
FIG. 1A is a front elevational view of the vehicle seating arrangement of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
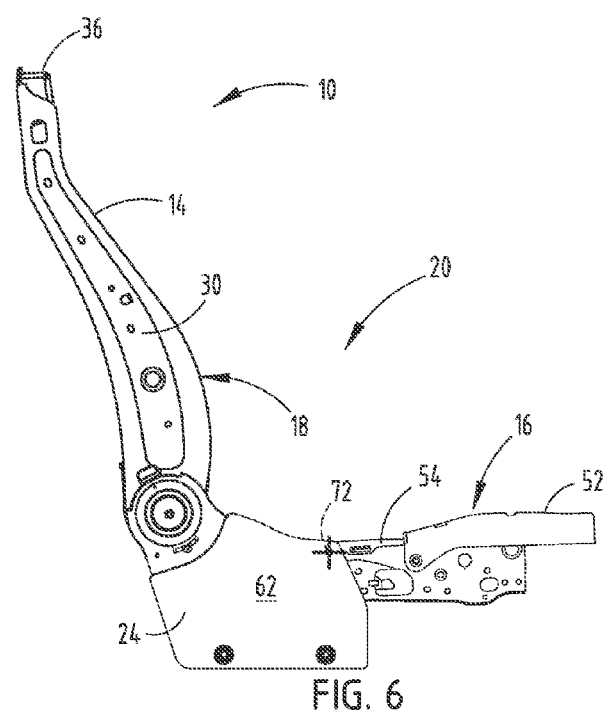
FIG. 6 is a side elevational view of the seat of FIG. 3.

Referring to FIGS. 1-5, the reference numeral 10 generally designates a seat assembly for a vehicle 12 that includes a frame 14 having a seat 16 and a seat back 18. The seat 16 is operable between a substantially horizontal deployed position 20 (FIG. 6) and a substantially vertical stowed position 22 (FIG. 10). A first brace 24 operably connects the frame 14 with a vehicle rocker panel 26. A second brace 27 operably connects the frame 14 with a vehicle transmission tunnel 28.

Referring again to FIGS. 1-5, the seat back 18 includes first and second side supports 30, 32 that are connected at a bottom portion thereof by a lower cross member 34 and at an upper portion thereof by an upper cross member 36. The upper cross member 36 includes headrest support slots 38 for receiving headrest supports. The front of the upper cross member 36 is concave and configured to provide support to the upper back of a user. The first and second side supports 30, 32 are connected with each end of the upper cross member 36 via welding, fasteners, etc. The first and second side supports 30, 32 are generally S-shaped and are connected via welding, fasteners, etc. to the lower cross member 34. A torsion bar 50 extends between the first and second side supports 30, 32 proximate the lower cross member 34. The lower cross member 34 wraps around the bottom portion of the first and second side supports 30, 32 and also assists in protecting the torsion bar 50. The first and second side supports 30, 32 are generally mirror images of one another. The construction of the first and second side supports 30, 32 is designed to provide comfort to the back of a user while also cradling an individual during a collision event to protect the user. The seat back 18 is designed for pivotal rotation relative to the seat 16 about a pivot axis defined by the torsion bar 50.

Referring again to FIGS. 1-5, the seat 16 includes a forward pan 52 that is supported on first and second seat side members 54, 56 operably connected with the first and second braces 24, 27. Spring members 58 extend from the forward pan 52 to a rear lateral member 59 and provide support to a cushion after assembly. The first and second braces 24, 27 suspend the seat 16 as well as the entire seat assembly 10 above a floor 60 (FIG. 2) of the vehicle 12. The first and second braces 24, 27 each include a vertically-extending web 62 and an outer-reinforcement flange 64. The first brace 24 also includes a rocker engagement member 66, which includes a generally inverted U-shaped bracket 68 that is configured to connect with the rocker panel 26. Together, the first brace 24 and the rocker engagement member 66 provide a strong structural component configured to support the seat assembly 10 inside the vehicle 12 in a suspended condition over the floor 60.

Figure 2:
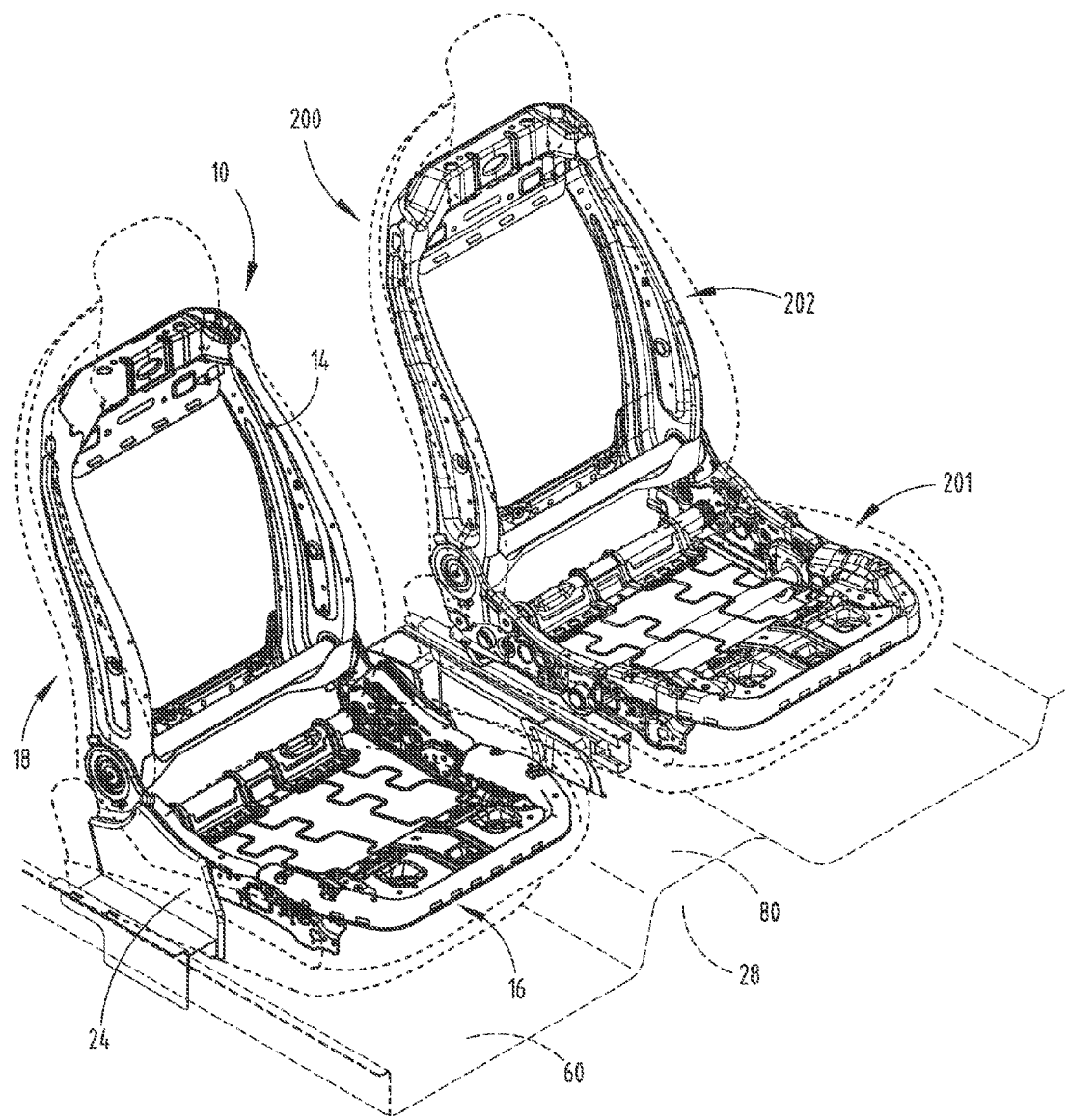
FIG. 2 is a top perspective view of a vehicle seating arrangement of the present invention.
Figure 3:
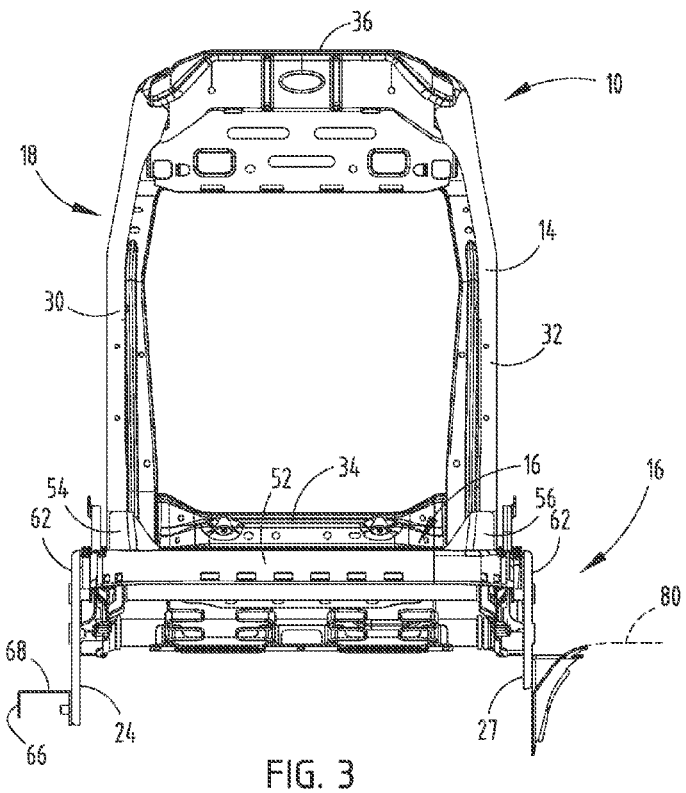
FIG. 3 is a front elevational view of one embodiment of a floating flip-up seat of the present invention.
Figure 4:
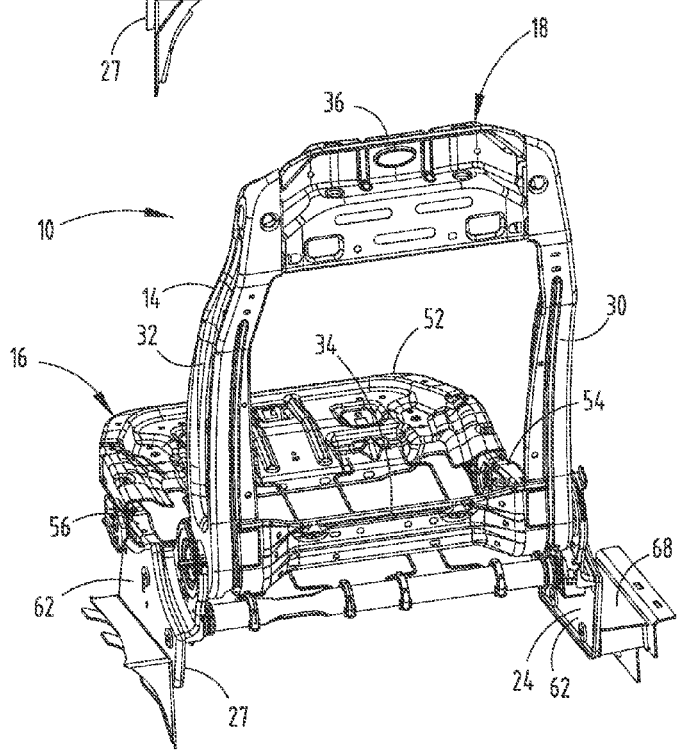
FIG. 4 is a top rear perspective view of the seat of FIG. 3.
Figure 5:
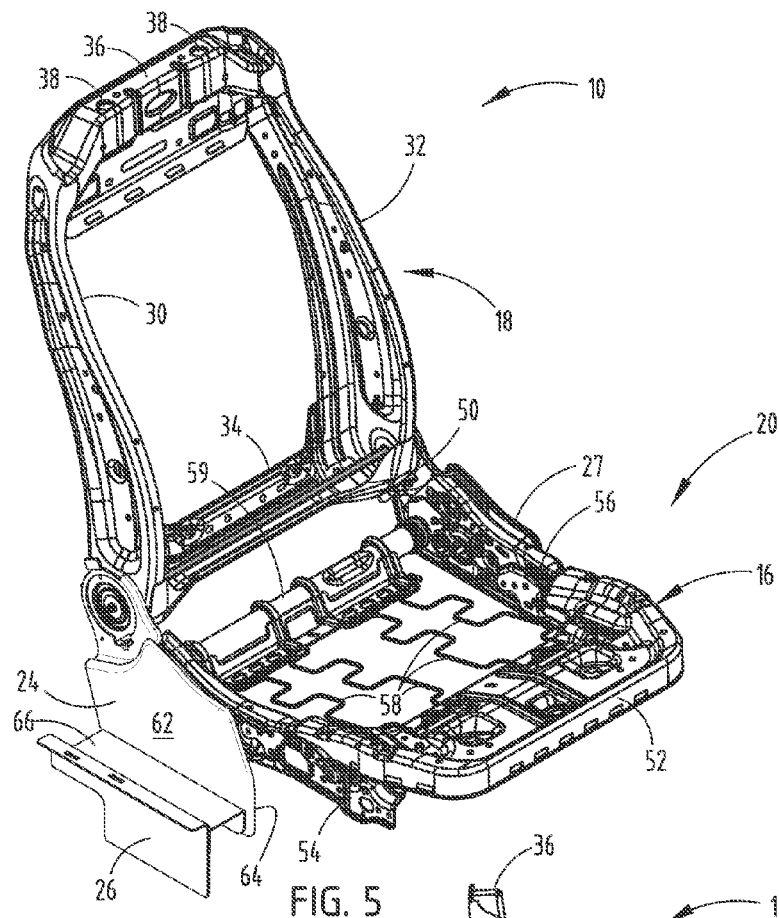
FIG. 5 is a top front perspective view of the seat of FIG. 3.

Referring now to FIGS. 6-8A, a top forward corner 70 of the first brace 24 includes a pivot pin 72, which generally defines an axis 71 of pivotal rotation of the seat 16. The pivot pin 72 extends from the top forward corner 70 of the first brace 24 into an aperture 74 defined on a top flange 76 of the first seat side member 54. It is also contemplated that the pivot pin 72 may extend from the top flange 76 of the seat 16 into an aperture defined in the first brace 24. The second seat side member 56 includes a similar construction to the first seat side member 54 of the seat 16, but is designed for pivotal rotation with the second brace 27. The second brace 27 is operably connected with a transmission tunnel casing 80 (FIG. 2). The second brace 27 is positioned on a top portion of the transmission tunnel casing 80, thus suspending, along with the first brace 24, the entire seat assembly 10 above the floor 60. Accordingly, the seat 16 is free to rotate about the axis 71 between the substantially vertical stowed position 22 and the substantially horizontal deployed position 20.

Figure 7:
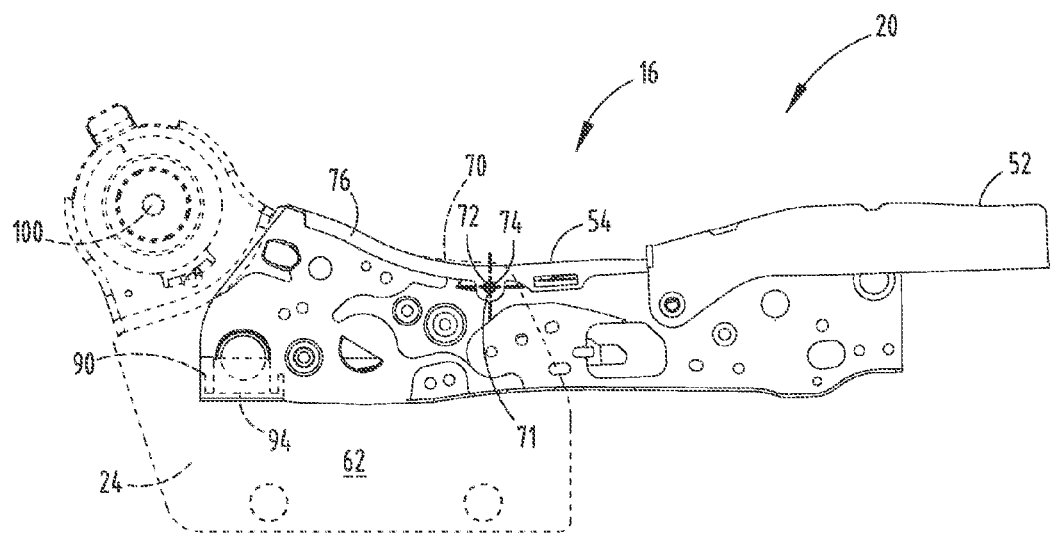
FIG. 7 is a partial side elevational view of a seat in a substantially horizontal position.
Figure 7A:
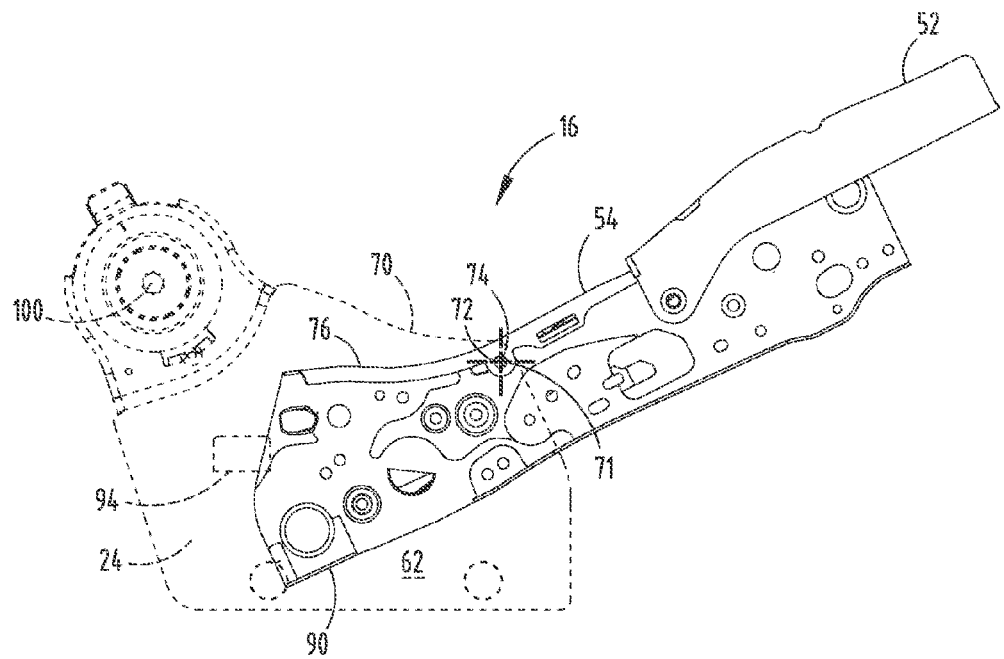
FIG. 7A is a partial side elevational view of the seat of FIG. 7 transitioning to a substantially vertical position.
Figure 13:
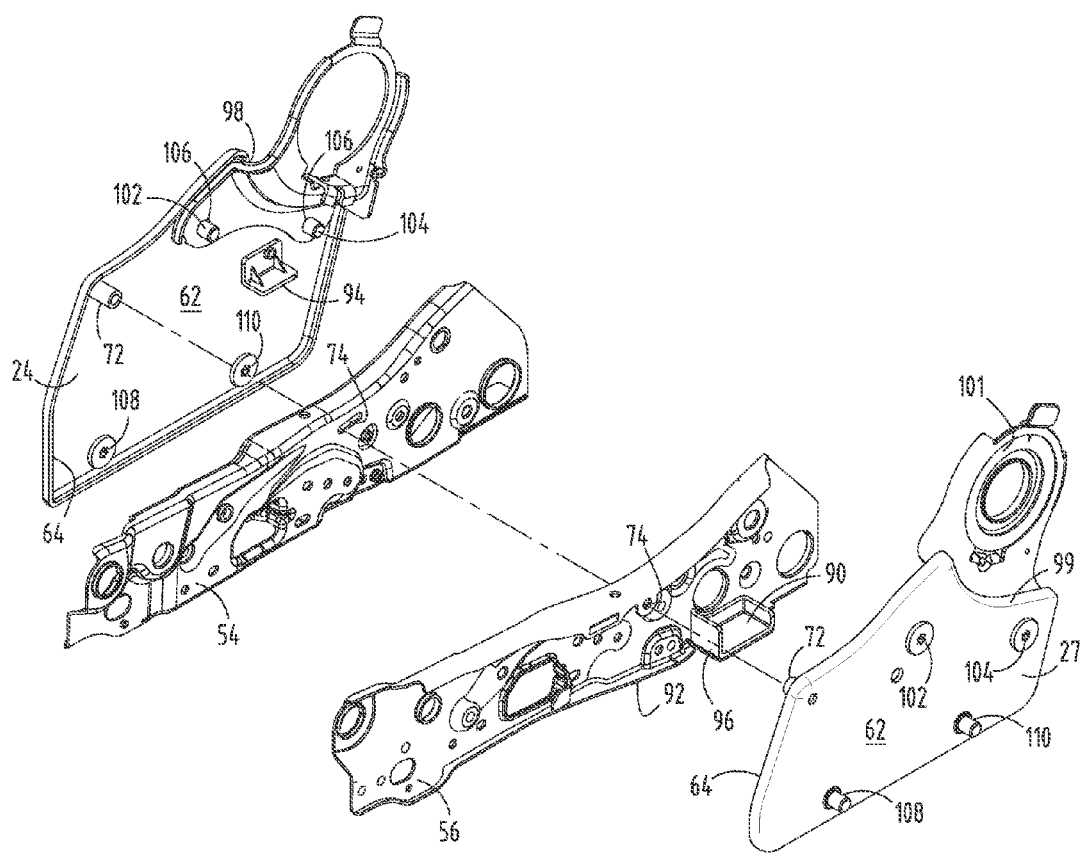
FIG. 13 is a first side top perspective exploded view of components of one embodiment of a seating arrangement of the present invention.
Figure 13A:
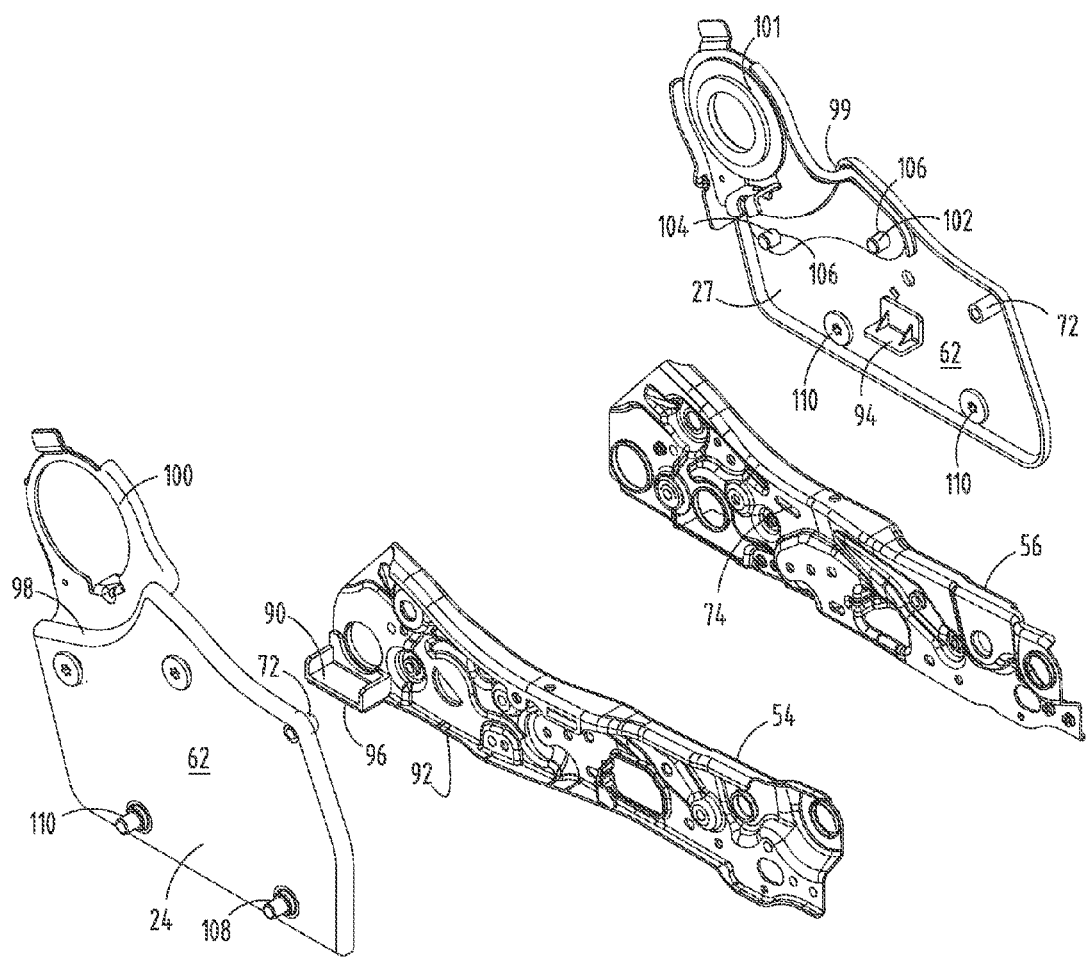
FIG. 13A is a second side top perspective exploded view of the components of FIG. 13.
Figure 14:
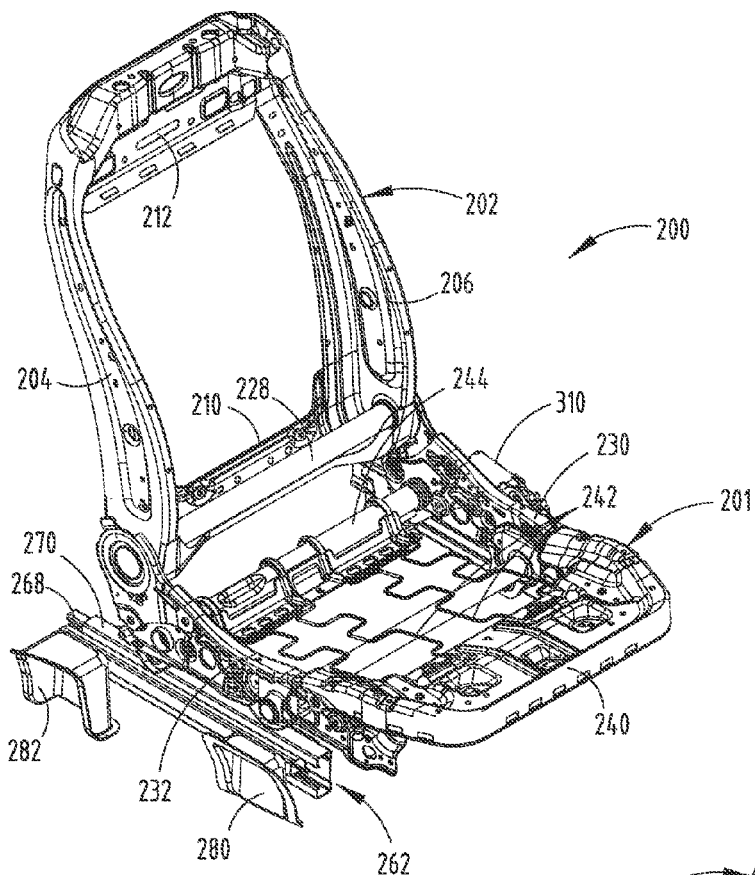
FIG. 14 is a first side top perspective view of another embodiment of a vehicle seat of the present invention.
Figure 15:
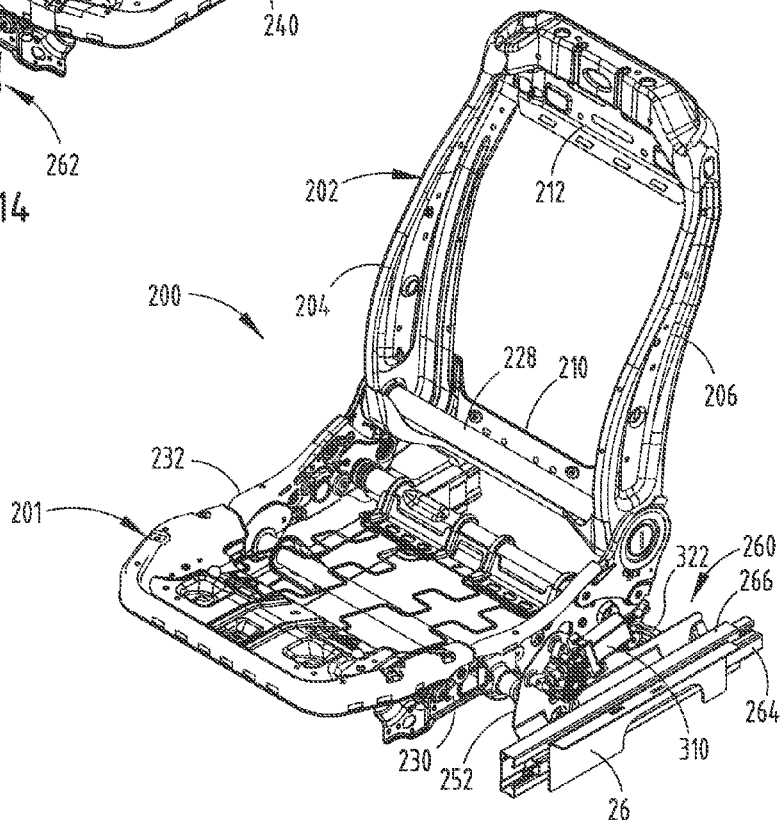
FIG. 15 is a second side top perspective view of the vehicle seat of FIG. 14.

As illustrated in the embodiments of FIGS. 9-12, the first seat side member 54 and the second seat side member 56 each have an outwardly-extending engagement flange 90 on a bottom edge 92 thereof adapted to abut a stop flange 94 of the vertically-extending web 62 when the seat 16 is in the substantially horizontal deployed position 20. The inwardly-extending engagement flange 90 extends in an outward direction from the first seat side member 54 and second seat side member 56, such that a distal edge 96 of the engagement flange 90 is in very close proximity to the vertically-extending web 62 of the first brace 24 and the second brace 27. As shown in FIGS. 13 and 13A, a space is generally defined between the first brace 24 and first seat side member 54, as well as between the second brace 27 and second seat side member 56, respectively. The space provides ample room for the engagement flange 90 to freely rotate between the substantially horizontal deployed position 20 and substantially vertical stowed position 22. Further, the space allows adequate room for the stop flange 94 to project slightly inwardly without it inhibiting rotational movement of the first seat side member 54 and second seat side member 56 during deployment from the substantially horizontal deployed position 20 to the substantially vertical stowed position 22, or from the substantially vertical stowed position 22 to the substantially horizontal deployed position 20. The stop flange 94 is aligned with the direction of travel of the outwardly-extending engagement flange 90, such that the stop flange 94 abuts the outwardly-extending engagement flange 90 when the first seat side member 54 and the second seat side member 56 are in the substantially horizontal deployed position 20 (FIG. 7). Accordingly, the first seat side member 54 and second seat side member 56, and consequently the seat 16 as a whole, are configured to stop rotational movement at the substantially horizontal deployed position 20, thereby maintaining a seated user in a substantially comfortable horizontal position.

Figure 8:
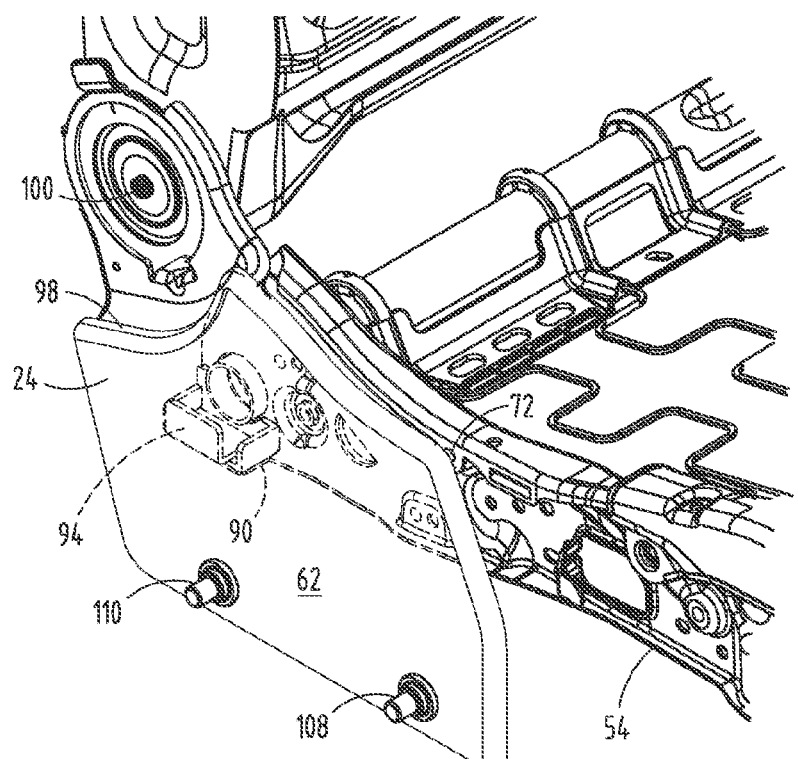
FIG. 8 is a partial top perspective view of a vehicle seat in the substantially horizontal position.
Figure 8A:
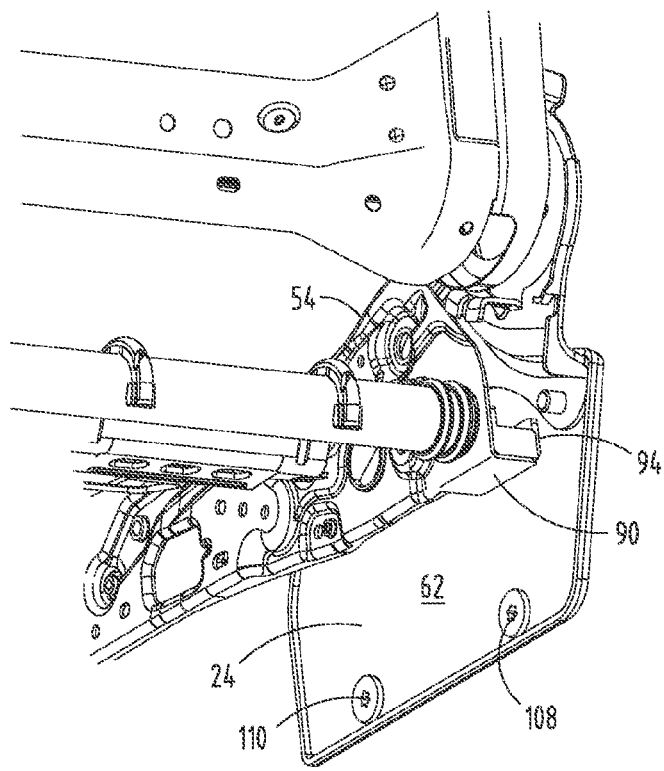
FIG. 8A is a bottom perspective view of the vehicle seat of FIG. 8.
Figure 11:
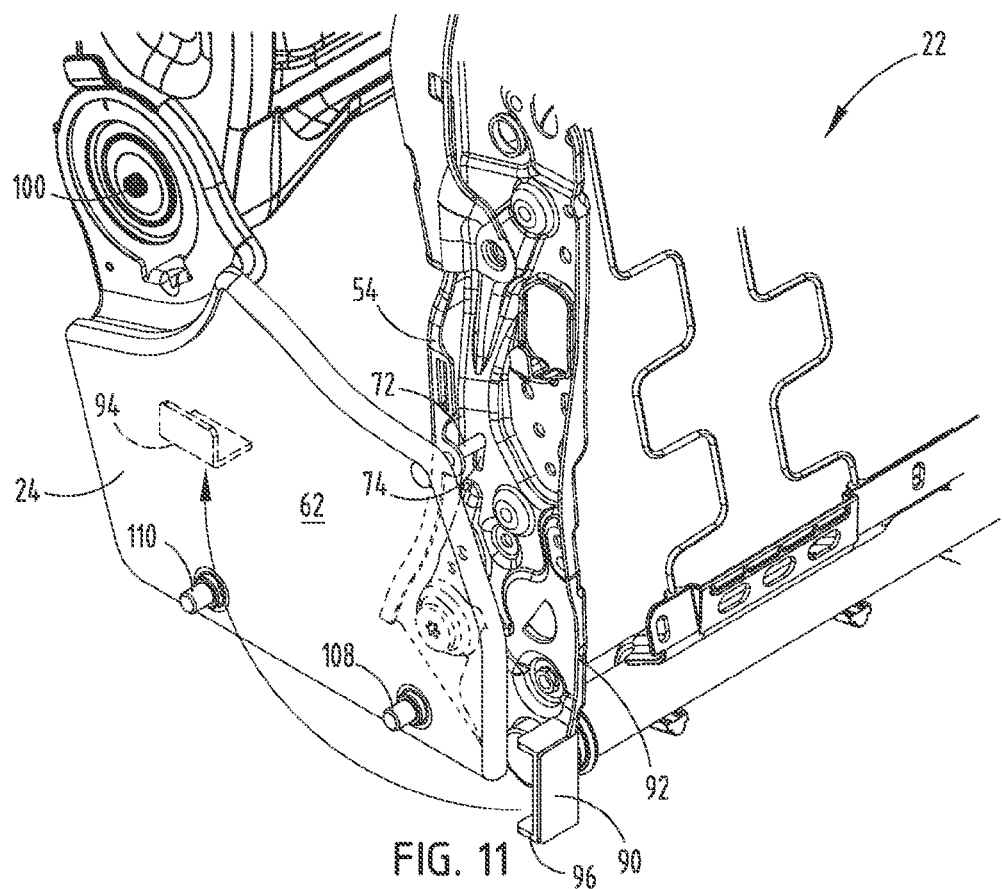
FIG. 11 is a partial top perspective view of the vehicle seat in a substantially vertical position.
Figure 12:
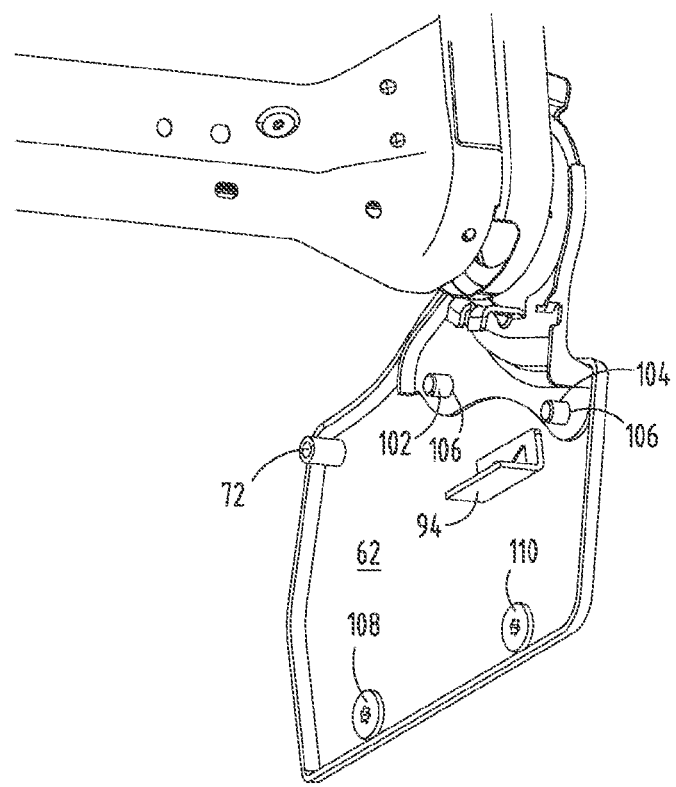
FIG. 12 is a bottom perspective of the vehicle seat of FIG. 11 with the seat removed.

Referring now to FIGS. 8, 10, and 11, the seat 16 is configured to move to the substantially vertical stowed position 22. To move the seat 16 to the substantially vertical stowed position 22, the outwardly-extending engagement flange 90 is rotated out of abutting contact with the stop flange 94 (FIG. 8), until the first and second seat side members 54, 56, as well as the seat 16 generally, are in the substantially vertical stowed position 22 (FIGS. 10 and 11). It is generally contemplated that the seat 16 may be spring-biased to the substantially vertical stowed position 22. When a user wishes to sit on the seat assembly 10, the user simply rotates the seat 16 manually downward until the outwardly-extending engagement flange 90 abuts the stop flange 94 on the interior side of the vertically-extending web 62 of the first and second braces 24, 27. It is also contemplated that the seat 16 may be operably connected with a motorized control that allows the user to move the seat 16 between the substantially vertical stowed position 22 and the substantially horizontal deployed position 20.

Referring to FIGS. 13 and 13A, the first brace 24 includes an arcuate rear edge 98 configured to engage a recliner heart assembly 100, which is operably connected to the first side support 30 of the seat assembly 10. Similarly, the second brace 27 includes an arcuate rear 99 configured to engage a recliner heart 101, which is operably connected to the second side support 32 of the seat assembly 10. The recliner heart assembly 100 allows the seat back 18 to rotate between a variety of reclined positions, thereby providing additional comfort to a user. First and second support pins 102, 104 extend inwardly from the first brace 24 and engage apertures 106 in the recliner heart assembly 100. Brace engagement bolts 108, 110 extend from a lower portion of the first brace 24 and the second brace 27.

Referring now to FIGS. 14-26, another embodiment of the present invention is illustrated. It will be generally understood that several of the components of the seat assembly 10 and a seat assembly 200 are similar, while others, including, but not limited to, how the seat assembly 200 is supported in the vehicle 12, are different. The seat assembly 200 generally includes a seat 201, as well as a seat back 202 having first and second side supports 204, 206 that are connected at a bottom portion thereof by a lower cross member 210 and at an upper portion thereof by an upper cross member 212. The front of the upper cross member 212 is concave and configured to provide support to the upper back of a user. A torsion bar 228 extends proximate to the lower cross member 210 between the first and second side supports 204, 206. The lower cross member 210 wraps around the bottom portion 208 of the first and second side supports 204, 206 and also protects the torsion bar 228 on a bottom side of the torsion bar 228. The first and second side supports 204, 206 are generally S-shaped mirror images of one another. The construction of the first and second side supports 204, 206 is designed to provide comfort to the back of a user while also cradling an individual during a collision event to protect the user. The seat back 202 is designed for pivotal rotation relative to the seat 201 about a pivot axis defined by the torsion bar 228, which extends through the recliner heart assembly 100.

Figure 16:
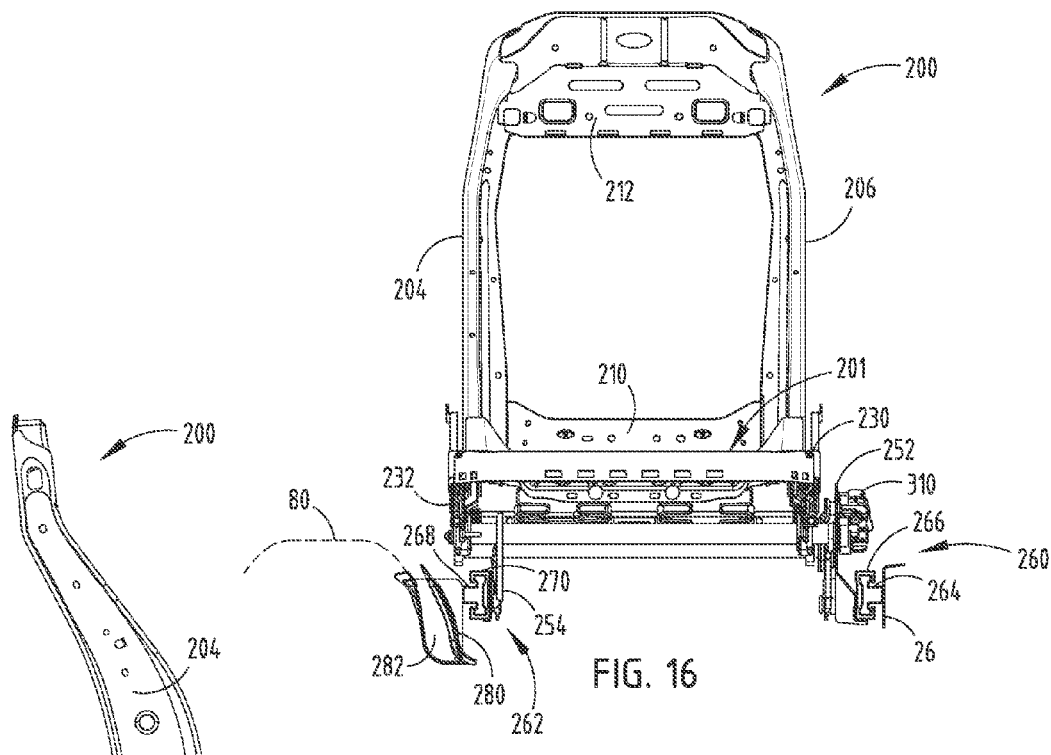
FIG. 16 is a front elevational view of the vehicle seat of FIG. 14.
Figure 17:
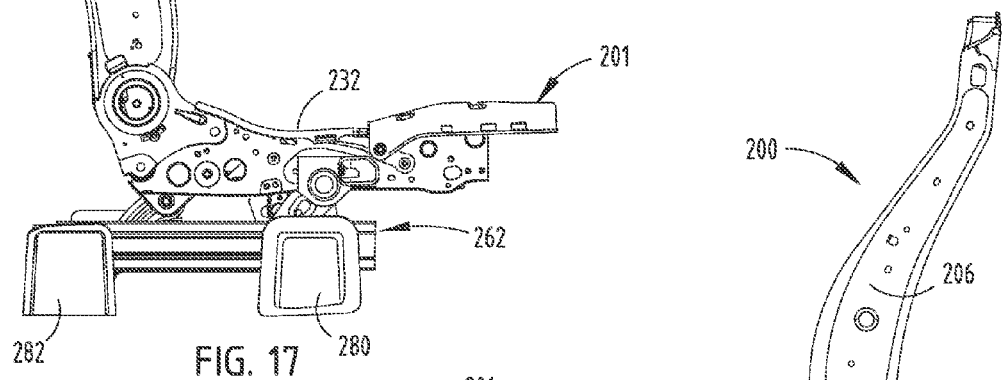
FIG. 17 is a first side elevational view of the vehicle seat of FIG. 14.
Figure 18:
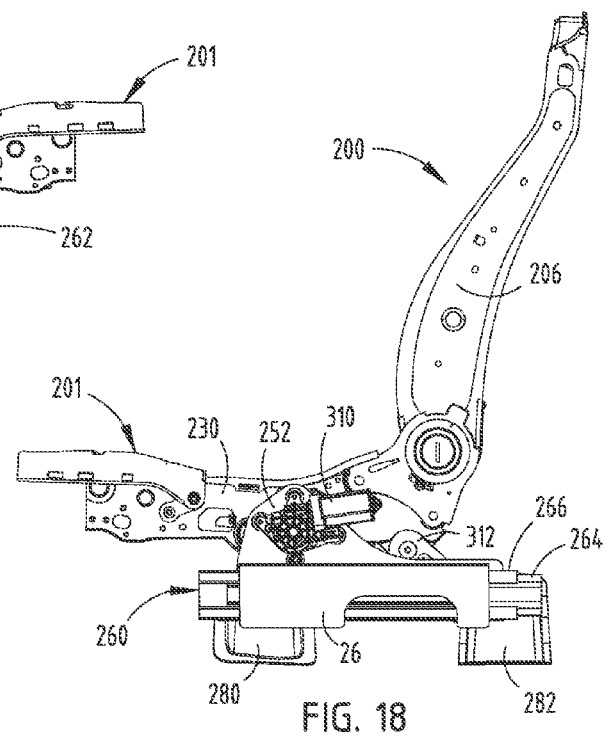
FIG. 18 is a second side elevational view of the vehicle seat of FIG. 14.
Figure 19:
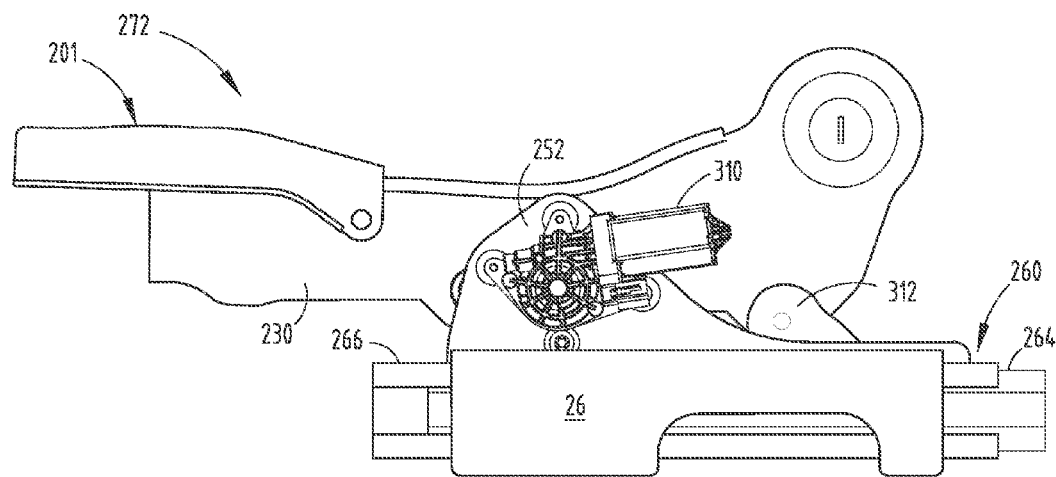
FIG. 19 is a partial side elevational view of the vehicle seat of FIG. 14 in a rearward position.
Figure 20:
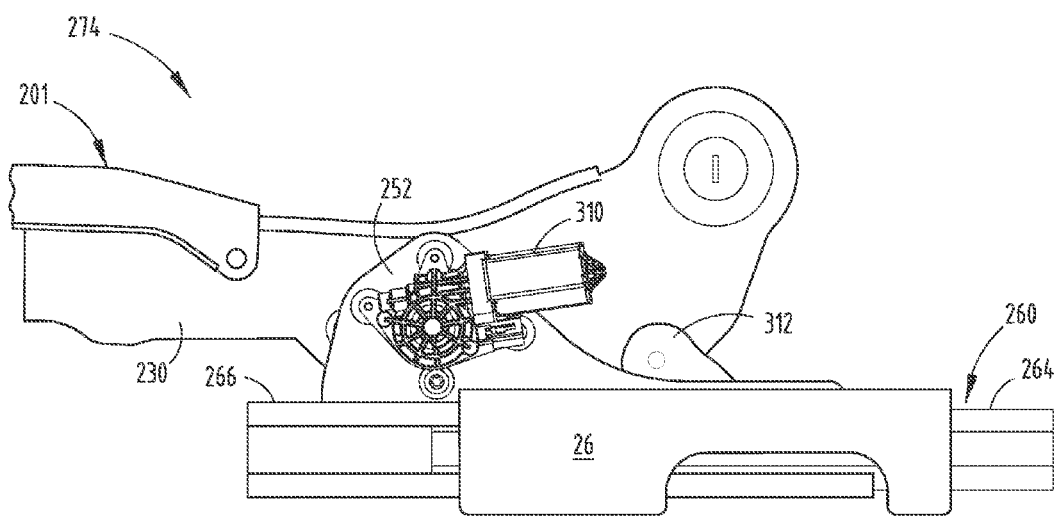
FIG. 20 is a partial side elevational view of the vehicle seat of FIG. 14 in a forward position.

Referring now to FIGS. 14-18, the seat 201 of the seat assembly 200 includes a first seat side member 230 and a second seat side member 232, supported on first and second braces 252, 254, respectively. The seat 201 also includes a forward pan 240 that is supported on the first and second seat side members 230, 232. Spring members 242 extend from the forward pan 240 to a rear lateral member 244 and provide support to a cushion after assembly. The first brace 252 is operably connected with a first slide assembly 260 disposed on the rocker panel 26 of the vehicle 12. The second side brace 254 is operably connected with a second slide assembly 262 disposed on the transmission tunnel casing 80 of the vehicle 12. The first and second braces 252, 254 are suspended above the floor 60 of the vehicle 12 and do not touch the floor 60 of the vehicle 12, but instead are suspended from the rocker panel 26 and transmission tunnel casing 80, respectively. The first slide assembly 260 includes a rocker panel rail 264 and a first brace slide 266, which are slidably engaged. The second slide assembly 262 includes a transmission tunnel casing rail 268 and a second brace slide 270 that are slidably engaged. Together, the first slide assembly 260 and second slide assembly 262 allow linear translation of the entire seat assembly 200 between a forward position 272 (FIG. 19) and a rearward position 274 (FIG. 20). The planar extent of the first slide assembly 260 and the second slide assembly 262 is generally vertically aligned, as illustrated in FIG. 16.

Figure 24:
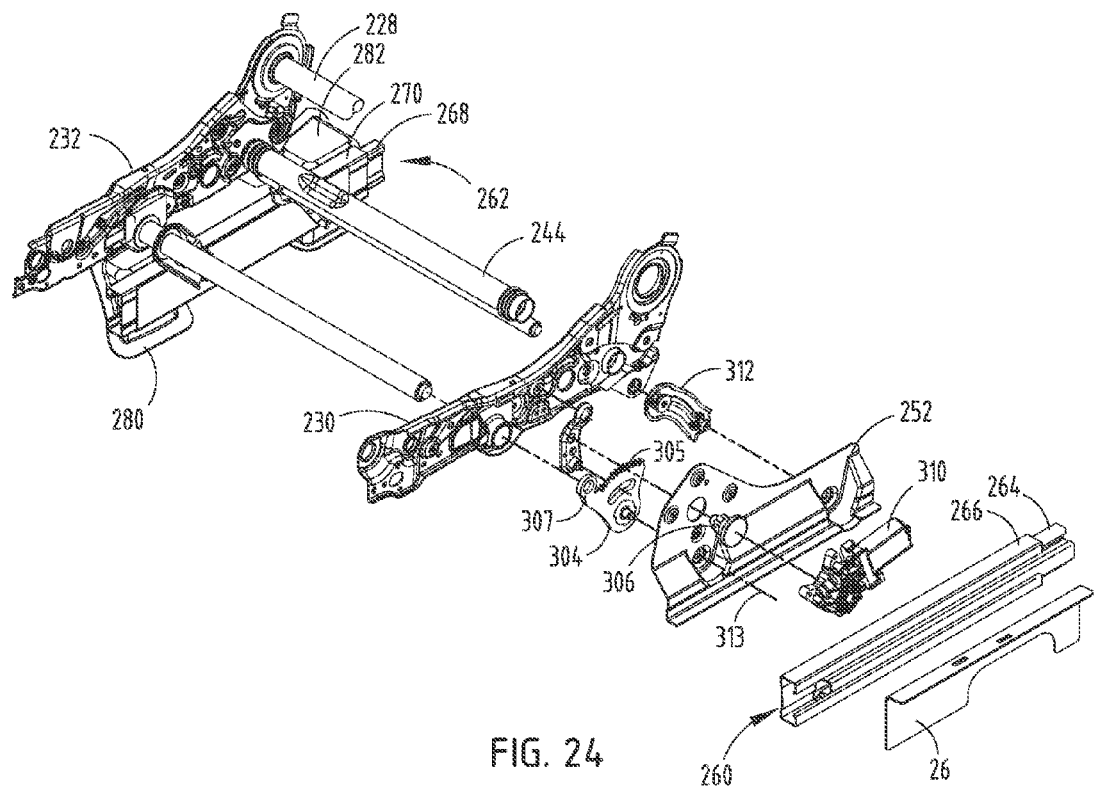
FIG. 24 is a top perspective view of supporting components of the vehicle seat partially exploded.
Figure 25:
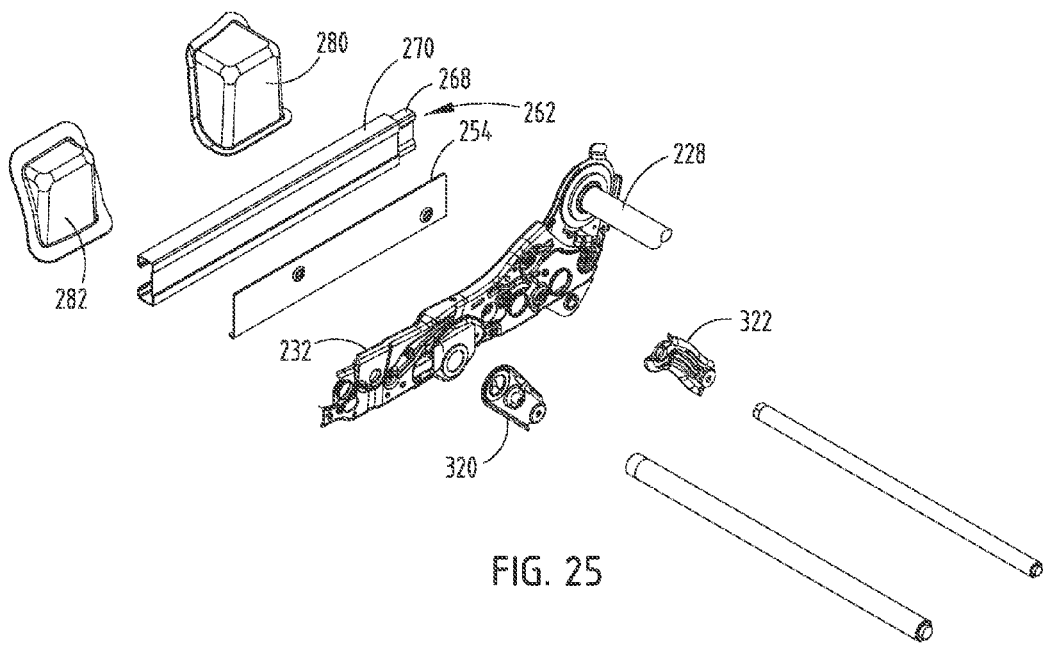
FIG. 25 is a top perspective view of the supporting components of the vehicle seat partially exploded.
Figure 26:
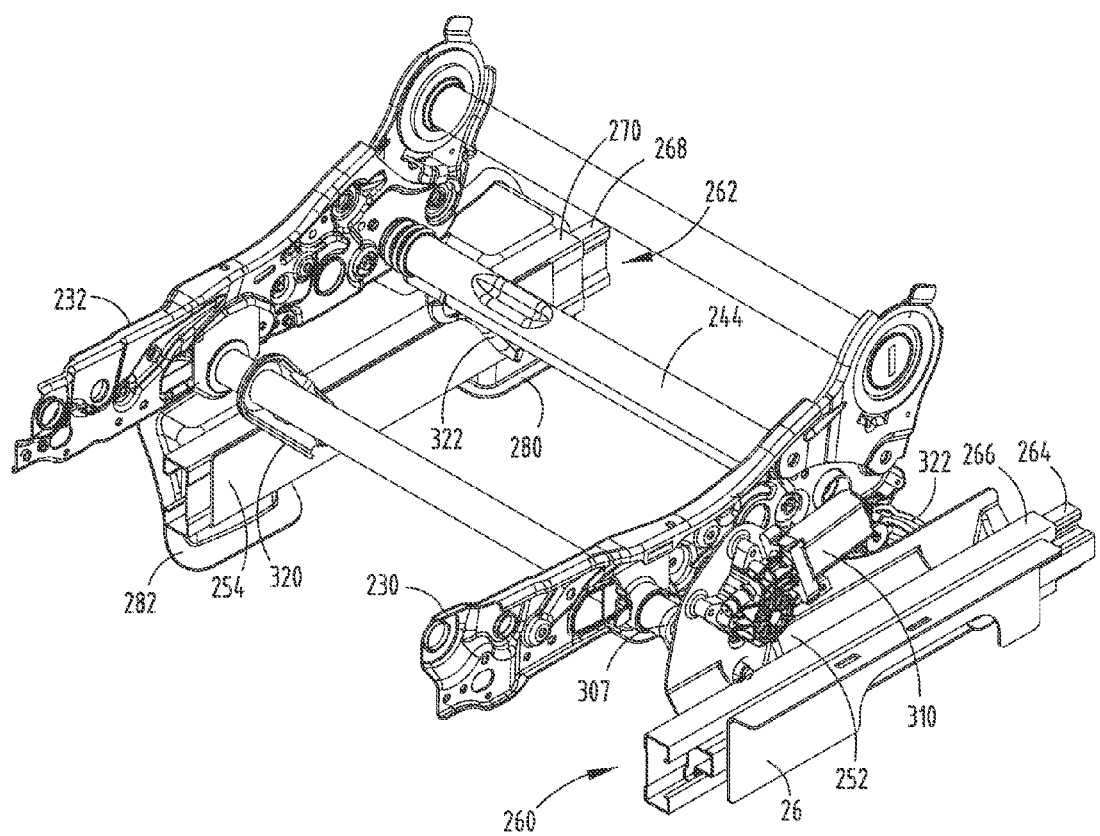
FIG. 26 is a top perspective view of the supporting components of the vehicle seat.

Referring again to FIGS. 14-18, as well as FIGS. 24-26, the transmission tunnel casing rail 268 is fixedly connected with a forward support 280 and a rearward support 282 that are connected with the transmission tunnel casing 80. The second brace 254 of the seat assembly 200 is fixedly connected with the second brace slide 270, which is slidably connected with the transmission tunnel casing rail 268. Similarly, the rocker panel rail 264, which is fixedly connected with the rocker panel 26, is slidably connected with the first brace slide 266 of the first slide assembly 260. The first brace slide 266 is fixedly connected with the first brace 252. Therefore, the seat assembly 200 is allowed to move between the forward and rearward positions 272, 274 as the first brace slide 266 slides over the rocker panel rail 264 and the second base slide 270 slides over the transmission tunnel casing rail 268. It is generally contemplated that the first and second slide assemblies 260, 262 may include a plurality of ball bearings located between the first and second slides 266, 270 and the rails 264, 268, respectively, that allow for lateral translation of the seat 201 between the forward and rearward positions 272, 274, although other configurations, such as greased slides, etc., may also be used.

Figure 21:
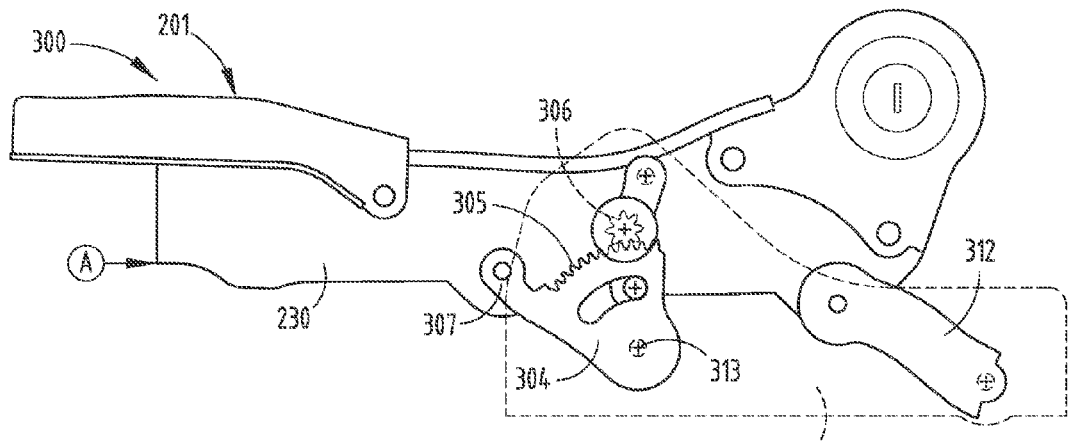
FIG. 21 is a side elevational view of the vehicle seat of FIG. 19 in a lowered position.
Figure 22:
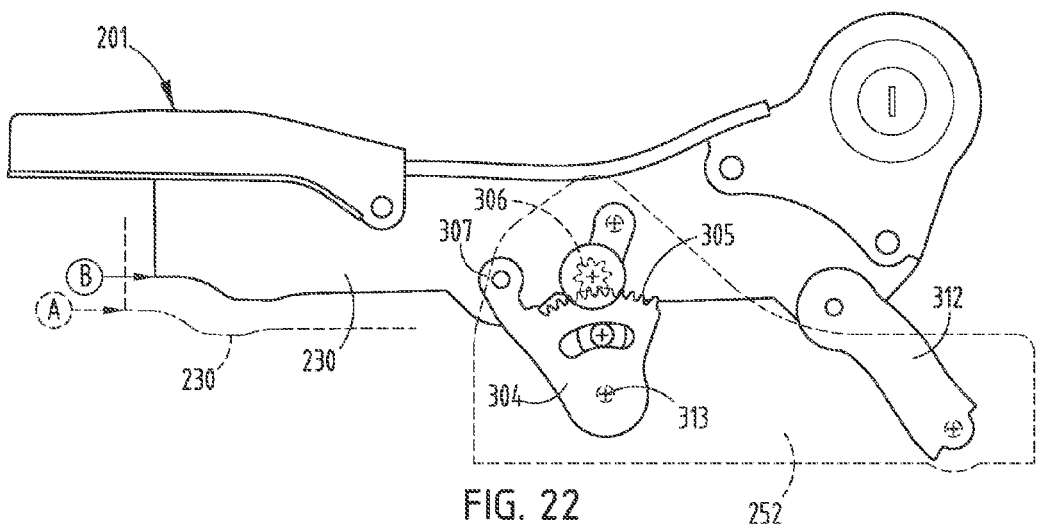
FIG. 22 is a side elevational view of the vehicle seat of FIG. 19 moving from the lowered positioned to a raised position.
Figure 23:
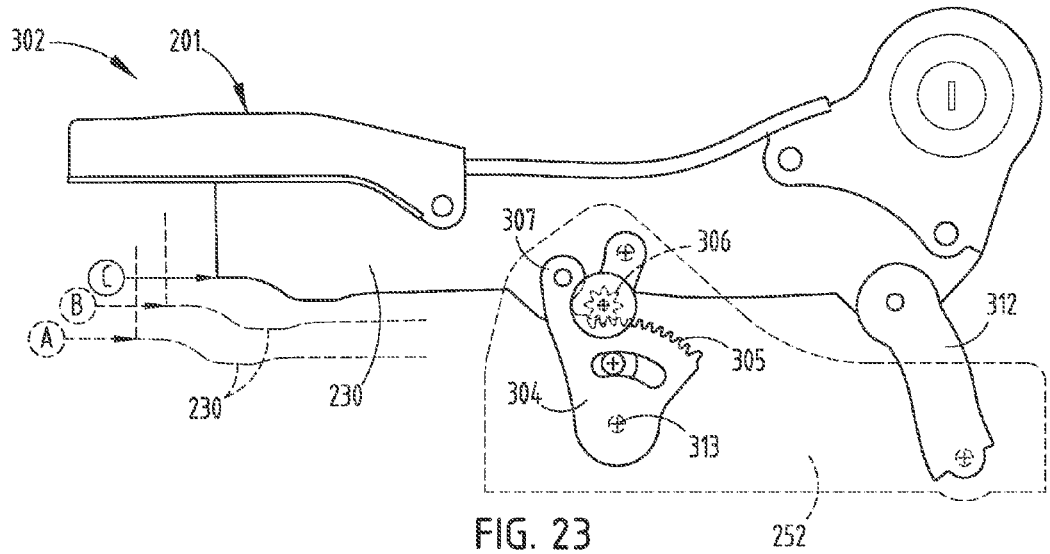
FIG. 23 is a side elevational view of the vehicle seat of FIG. 19 in the raised position.

Referring now to FIGS. 21-23, the seat assembly 200 is also vertically movable between a lowered position 300 (FIG. 21) and a raised position 302 (FIG. 23). As shown in FIG. 21, the seat assembly 200 includes a toothed bracket 304 having a plurality of teeth 305 in communication with a gear 306. The toothed bracket 304 engages the first seat side member 230 of a pivot member 307. The gear 306 is operably connected with a motorized unit 310 (FIGS. 15 and 24) that is adapted to rotate the gear 306 in clockwise and counterclockwise directions. A rear portion of the seat 201 is connected to a rear support member 312. The rear support member 312 is rotatably coupled with the rear portion of the seat 201 at a top end thereof and the first brace 252 at a lower portion thereof. Rotation of the gear 306 by the motorized unit 310 in a counterclockwise direction results in the gear 306 rotating the toothed bracket 304 about a pivot point 313 in a clockwise direction. Consequently, the seat assembly 200 elevates from position A to position B (an intermediate position of the seat assembly 200, illustrated in FIG. 22). At the same time, the rear support member 312 rotates slightly clockwise, supporting a rear portion of the seat 201. Further rotation of the gear 306 in a counterclockwise direction causes further rotation of the toothed bracket 304 to a fully elevated position C (FIG. 23). At the same time, the rear support member 312 rotates in a clockwise direction, supporting the rear portion of the seat assembly 200 over the first brace 252. Forward and rearward seat supports 320, 322 (FIG. 26) connect the second brace 252 with the second seat side member 232. The forward and reward seat supports 320, 322 allow for raising and lowering of the seat 201. Thus, it will be understood that the rotation of the gear 306 moves the first seat side member 230 and the second seat side member 232 equally to allow for uniform raising and lowering of the seat assembly 200.

Notably, with respect to each embodiment discussed herein, the first and second braces are connected with the vehicle rocker panel and transmission tunnel, respectively, of the vehicle. Accordingly, the seat assembly of the present invention provides substantial leg and foot room beneath the seat assembly to provide additional comfort to a user sitting behind the seat assembly. Alternatively, the seat assembly can provide increased storage space for items that are to be transported in the vehicle. In addition, when a passenger is not present to sit on the seat assembly, the seat, when in the substantially vertical stowed position, provides additional cargo area for transporting various items in a foot well of a passenger seat.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A passenger seat assembly for a vehicle comprising:
   a seat operably connected to a seat frame and rotatable between deployed and stowed positions, wherein the seat is rotatable relative to the frame about a first axis;
   a forward seat pan pivotally coupled to first and second side seat members about a second axis;
   a seatback rotatable relative to the frame about a third axis;
   a first brace supporting the frame and movably connected to a vehicle rocker panel; and
   a second brace supporting the frame and movably connected to a vehicle transmission tunnel.

2. The passenger seat assembly of claim 1, further comprising:
   a first slide assembly connecting the first brace to the vehicle rocker panel and a second slide assembly connecting the second brace to the vehicle transmission tunnel.

3. The passenger seat assembly of claim 2, wherein a planar portion of the first and second slide assemblies is vertically aligned against the vehicle rocker panel and vehicle transmission tunnel, respectively.

4. The passenger seat assembly of claim 1, wherein the seat is rotatably and slidably connected to the frame.

5. The passenger seat assembly of claim 1, wherein the first and second braces each include a vertically-extending web with an upper support flange.

6. The passenger seat assembly of claim 1, wherein the seatback is disposed substantially directly above the first and second braces.

7. The passenger seat assembly of claim 1, wherein only the first and second braces support the seat inside the vehicle.

8. The passenger seat assembly of claim 1, wherein the seat is vertically adjustable between raised and lowered positions.

9. The passenger seat assembly of claim 5, wherein each vertically-extending web includes an inwardly-extending stop flange.

10. The passenger seat assembly of claim 9, wherein the first and second side seat members, each having an outwardly-extending engagement flange configured to abut the inwardly-extending stop flange on each vertically-extending web.

11. The passenger seat assembly of claim 1, wherein the first axis is positioned below and forward relative to the third axis.

12. A vehicle seat assembly comprising: a seat operably connected to a seat frame and rotatable relative thereto about a first axis between deployed and stowed positions; a seatback rotatable relative to the frame about a second axis; a first brace supporting the frame and disposed between the seat and a vehicle rocker panel; and a second brace positioned under the seat between sides of the frame and connecting the frame to a vehicle transmission tunnel.

* * * * *